(12) United States Patent
Xie

(10) Patent No.: US 12,030,199 B1
(45) Date of Patent: Jul. 9, 2024

(54) PET SHAVER

(71) Applicant: Jianwu Xie, Xiangtan (CN)

(72) Inventor: Jianwu Xie, Xiangtan (CN)

( * ) Notice: Subject to any disclaimer, the term of this patent is extended or adjusted under 35 U.S.C. 154(b) by 0 days.

(21) Appl. No.: 18/405,901

(22) Filed: Jan. 5, 2024

(51) Int. Cl.
  *B26B 21/40* (2006.01)
  *B26B 21/02* (2006.01)
  *B26B 21/52* (2006.01)
  *A01K 13/00* (2006.01)

(52) U.S. Cl.
  CPC .............. *B26B 21/40* (2013.01); *B26B 21/02* (2013.01); *B26B 21/521* (2013.01); *A01K 13/00* (2013.01)

(58) Field of Classification Search
  CPC ....... B26B 21/02; B26B 21/12; B26B 21/125; B26B 21/14; B26B 21/40; B26B 21/521; B26B 19/3806; B26B 19/3813; A01K 13/00; A01K 13/002
  USPC .......................................................... 30/41.6
  See application file for complete search history.

(56) References Cited

U.S. PATENT DOCUMENTS

| | | | | |
|---|---|---|---|---|
| 2,837,820 A * | 6/1958 | Ostrowski | ............... | B26B 21/16 30/67 |
| 3,183,591 A * | 5/1965 | Dumont | .................. | B26B 19/42 30/34.05 |
| 4,378,633 A * | 4/1983 | Jacobson | .............. | B26B 21/227 30/50 |
| 4,502,217 A * | 3/1985 | Schaechter | ......... | B26B 21/4018 30/83 |
| 5,251,376 A * | 10/1993 | Althaus | ................. | B26B 21/227 30/57 |
| 5,402,697 A * | 4/1995 | Brooks | ................... | B26B 19/40 30/34.2 |
| D358,909 S * | 5/1995 | Rawski | ............................ | 30/30 |
| 5,678,311 A * | 10/1997 | Avidor | .................... | B26B 21/34 30/34.2 |
| 5,794,348 A * | 8/1998 | Scott | ....................... | B26B 21/12 30/220 |
| 5,933,960 A * | 8/1999 | Avidor | .................... | B26B 21/34 30/34.2 |
| 6,070,327 A * | 6/2000 | Taso | ........................ | B26B 21/40 30/34.2 |
| 6,125,542 A * | 10/2000 | Somma | ................... | B26B 21/36 30/42 |
| 6,397,472 B1 * | 6/2002 | Kayal | .................... | B26B 21/12 30/30 |
| 6,782,846 B1 * | 8/2004 | Porter | .................... | B26B 21/16 30/34.2 |
| 7,200,936 B2 * | 4/2007 | Coffin | .................... | B26B 21/44 156/577 |
| 8,132,540 B1 * | 3/2012 | Strebeigh | ............ | B26B 19/3853 119/609 |

(Continued)

*Primary Examiner* — Jason Daniel Prone
(74) *Attorney, Agent, or Firm* — S.J. Intellectual Property LTD.

(57) ABSTRACT

The pet shaver includes a main body frame, a shaving strip and a roller. The main body frame has a working end. A part of the working end extends in a first direction, and the part of the working end has a first side portion and a second side portion which are opposite to each other. The shaving strip is arranged on the first side portion and extends in the first direction. The roller is detachably connected to the second side portion. An axis of the roller extends in the first direction. The roller is capable of rotating around the axis relative to the second side portion, and a circumferential surface of the roller is provided with an adhesive layer.

6 Claims, 4 Drawing Sheets

(56) References Cited

U.S. PATENT DOCUMENTS

| | | | |
|---|---|---|---|
| 8,359,755 B1* | 1/2013 | Laube | A01K 13/002 30/340 |
| 8,484,851 B2* | 7/2013 | Buchan | B26B 21/4081 30/32 |
| 8,505,492 B2* | 8/2013 | Werner | A01K 13/002 119/609 |
| 8,683,640 B2* | 4/2014 | Cole | A46B 7/04 15/104.002 |
| 8,720,381 B2 | 5/2014 | Wang | |
| 8,984,697 B2* | 3/2015 | Knopow | A47L 25/005 15/104.002 |
| 9,374,982 B2 | 6/2016 | Liang et al. | |
| 9,862,107 B2* | 1/2018 | Perlberg | B26B 21/34 |
| 9,867,363 B2* | 1/2018 | Ristaniemi | A01K 13/002 |
| 10,093,031 B2* | 10/2018 | Ren | B26B 21/4018 |
| 10,337,132 B1* | 7/2019 | Mathis | B26B 19/20 |
| 10,342,215 B2* | 7/2019 | De Koning-Trum | A01K 13/002 |
| 10,384,359 B2* | 8/2019 | Houbolt | B26B 21/34 |
| 10,391,648 B2* | 8/2019 | Roth | B26B 21/4087 |
| 11,623,338 B2* | 4/2023 | Cafasso | A01K 13/002 16/422 |
| 2007/0169720 A1* | 7/2007 | Roy | A01K 13/002 119/615 |
| 2009/0211101 A1* | 8/2009 | Azar | B26B 19/382 30/140 |
| 2009/0223008 A1 | 9/2009 | Kissel, Jr. | |
| 2011/0067644 A1 | 3/2011 | Prochaska | |
| 2013/0133587 A1 | 5/2013 | Pelfrey | |
| 2014/0238310 A1* | 8/2014 | Holt, Jr. | A01K 13/002 119/631 |
| 2017/0334079 A1* | 11/2017 | Png | B26B 19/48 |
| 2018/0111280 A1* | 4/2018 | Marut | B26B 21/4018 |
| 2021/0291391 A1* | 9/2021 | Brenner | B26B 19/18 |

* cited by examiner

PET SHAVER

TECHNICAL FIELD

The present disclosure relates to the technical field of pet supplies, in particular to a pet shaver.

BACKGROUND

With the improvement of living standards, people's demand for pets is gradually increasing, and the pets become a part of our lives.

When grooming or an operation is carried out on the pet, hair of the pet needs to be shaved by means of a shaver, some of the shaved hair will be scattered around or adhere to the body of the pet or clothes of an operator, the operator usually needs to additionally use a tool capable of cleaning the hair of the pet to clean the scattered hair, the additional purchase cost will be caused by the additional cleaning tool, and it is inconvenient for the operator to use and store the tool.

Therefore, for the above phenomenon, there is an urgent need to provide a pet shaver having multiple functions, which at least has the functions of shaving the pet and cleaning the scattered hair of the pet.

SUMMARY

The present disclosure aims to provide a pet shaver, which has the functions of shaving a pet and cleaning scattered hair of the pet at the same time.

In order to achieve the above purpose, the present disclosure provides the following technical solution:

the present disclosure discloses the pet shaver, comprising: a main body frame, a shaving strip and a roller, where the main body frame has a working end, the working end at least partially extends in a first direction, and the working end has a first side portion and a second side portion which are opposite to each other; the shaving strip is arranged on the first side portion and extends in the same direction as the portion of the working end extending in the first direction; and the roller is detachably connected to the second side portion, an axis of the roller extends in the first direction, the roller is capable of rotating around the axis relative to the second side portion, and a circumferential surface of the roller is provided with an adhesive layer.

Further, the pet shaver further comprises a mounting frame, where one side of the mounting frame is provided with a mounting groove fitted with the second side portion, the second side portion is connected to the mounting frame by means of the mounting groove, and the roller is located on the side of the mounting frame facing away from the second side portion and is detachably connected to the mounting frame.

Further, two ends of the roller in an extension direction are respectively provided with shaft head structures, the mounting frame is provided with two connection frames corresponding to the two shaft head structures respectively, and the roller is rotatably connected to the two connection frames by means of the two shaft head structures.

Further, the pet shaver further comprises a handle, where the main body frame further has a connection end extending in a second direction, the second direction is perpendicular to the first direction, and the handle is mounted at the connection end and extends in the same direction as the connection end.

Further, the handle comprises a first housing and a second housing fitted with each other and connected in a snap-fitted manner, the connection end is provided with a limiting structure, clamping grooves fitted with the limiting structure are formed in the first housing and the second housing respectively, and the connection end is connected to the handle by means of the clamping grooves of the first housing and the second housing.

Further, the end portion of the handle away from the main body frame in an extension direction is provided with a strap hole.

Further, the shaving strip comprises a plurality of shaving blades uniformly distributed at intervals in the first direction.

It can be seen from the analysis that the present disclosure discloses the pet shaver, when the pet shaver is in use, when hair of a pet needs to be shaved by means of the shaving strip, and when the scattered hair needs to be cleaned, the roller can be rolled to adhere the scattered hair by means of the adhesive layer provided on the circumferential surface of the roller. The pet shaver disclosed herein has the functions of shaving the pet and cleaning the scattered hair of the pet at the same time, thereby solving the technical problem that the scattered hair needs to be cleaned by means of additional cleaning tools after a single shaver is used.

BRIEF DESCRIPTION OF DRAWINGS

Drawings constituting a portion of the present application are used for providing a further understanding to the present disclosure. Schematic embodiments of the present disclosure and descriptions thereof are intended to explain the present disclosure, and should not be construed to unduly limit the present disclosure. In the drawings.

Figure 1:
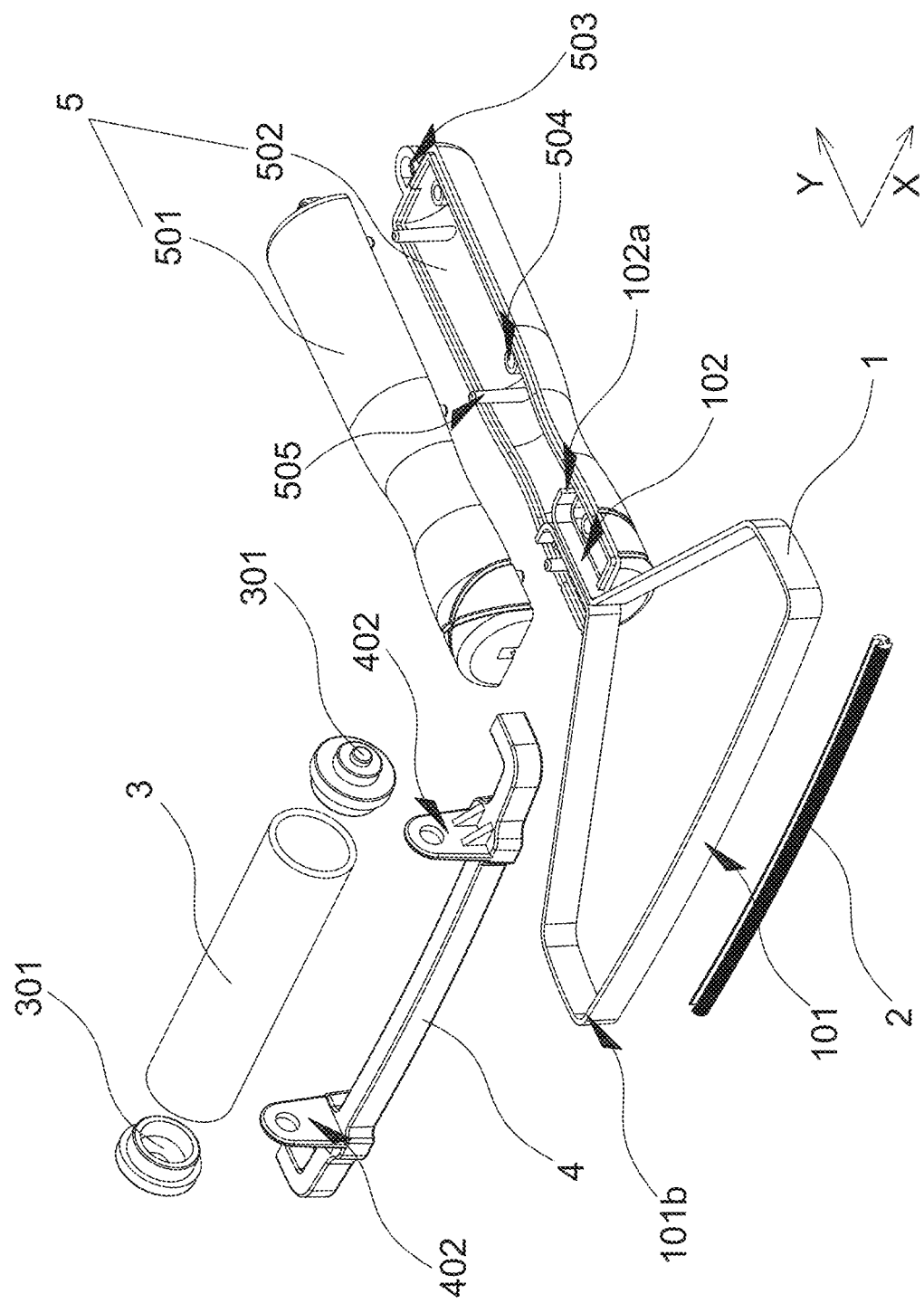
FIG. 1 is an exploded structure diagram of a pet shaver provided in an embodiment of the present disclosure at one angle.

Description of reference numerals: 1. main body frame; 101. working end; 101a. first side portion; 101b. second side portion; 102. connection end; 102a. limiting structure; 2. shaving strip; 3. roller; 301. shaft head structure; 4. mounting frame; 401. mounting groove; 402. connection frame; 5. handle; 501. first housing; 502. second housing; 503. strap hole; 504. mounting hole; 505. mounting column; X. first direction; and Y. second direction.

DETAILED DESCRIPTION OF THE EMBODIMENTS

The present disclosure is described in detail below with reference to the accompanying drawings and in conjunction with embodiments. Each example is provided to explain the present disclosure instead of limiting the present disclosure. In fact, those skilled in the art will know that modifications and variations may be made in the present disclosure without departing from the scope or spirit of the present disclosure. For example, features shown or described as part of one embodiment may be used in another embodiment to produce yet another embodiment. Therefore, it is expected that the present disclosure includes such modifications and variations that fall within the scope of the appended claims and equivalents thereof.

In the descriptions of the present disclosure, orientations or positional relationships indicated by the terms "longitudinal", "transverse", "upper". "lower", "front", "rear", "left", "right", "vertical", "horizontal", "top", "bottom" and the like are orientations or positional relationships based on the drawings, are only for the purpose of facilitating describing of the present disclosure, and do not indicate that the present disclosure must be constructed and operated in the specific orientations. Therefore, they cannot be understood as limitations on the present disclosure. The terms "connection", "connecting" and "arrangement" used in the present disclosure should be understood in a broad sense, for example, the connection may be fixed connection, and may also be detachable connection; the connection may be direct connection, and may also be indirect connection by means of intermediate components; the connection may be wired electrical connection and wireless electrical connection, and may also be wireless communication signal connection; and for those of ordinary skill in the art, the specific meanings of the above-mentioned terms can be understood according to the specific situations.

The accompanying drawings show one or more examples of the present disclosure. Numeral and letter marks are used in the detailed descriptions to refer to the features in the accompanying drawings. Similar or like reference signs in the drawings and descriptions have been used to refer to similar or like parts of the present disclosure. As used herein, the terms "first", "second", "third" and the like are used interchangeably to distinguish one component from another, and are not intended to indicate the positions or importance of individual components.

Figure 2:
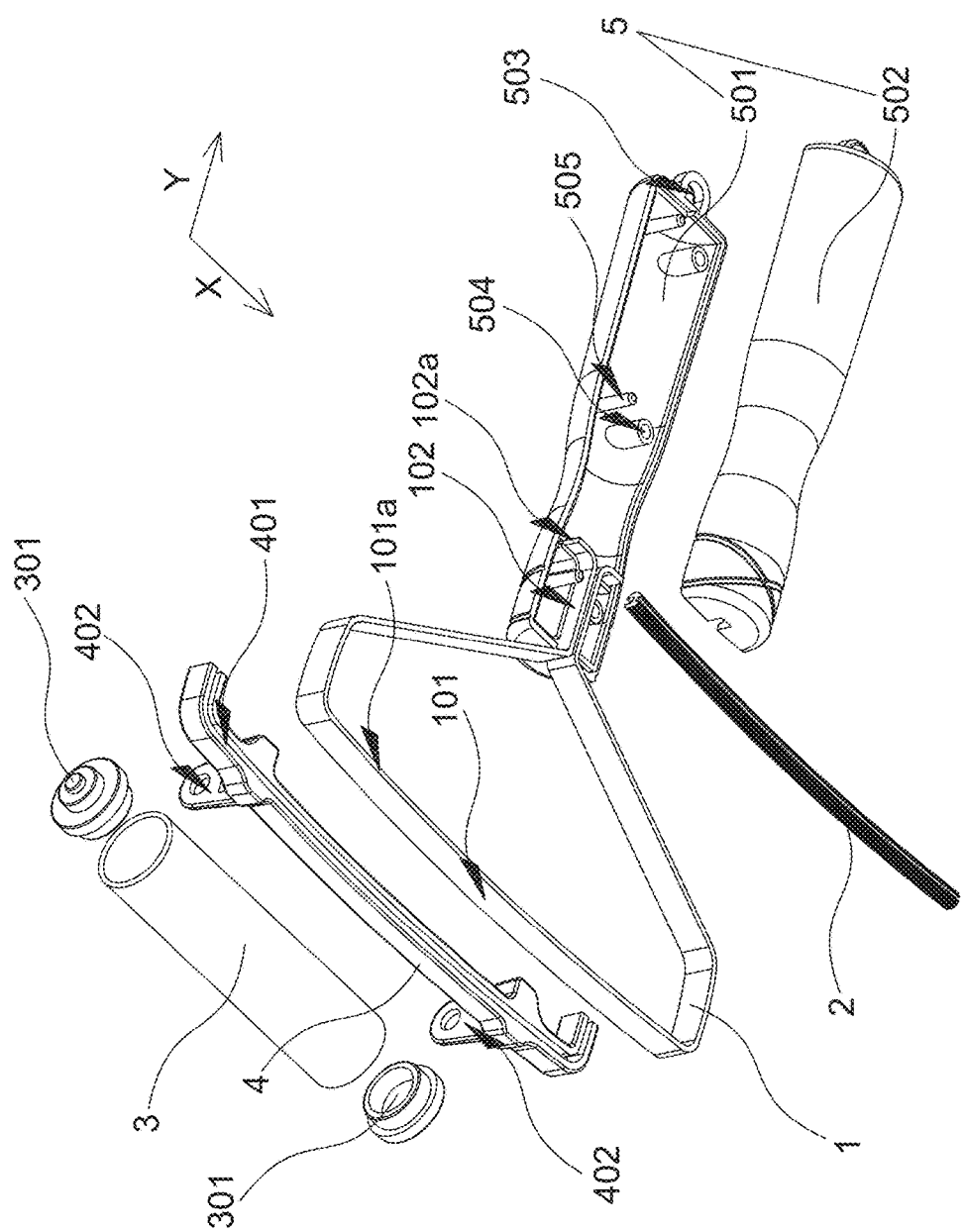
FIG. 2 is an exploded structure diagram of the pet shaver provided in the embodiment of the present disclosure at another angle.
Figure 3:
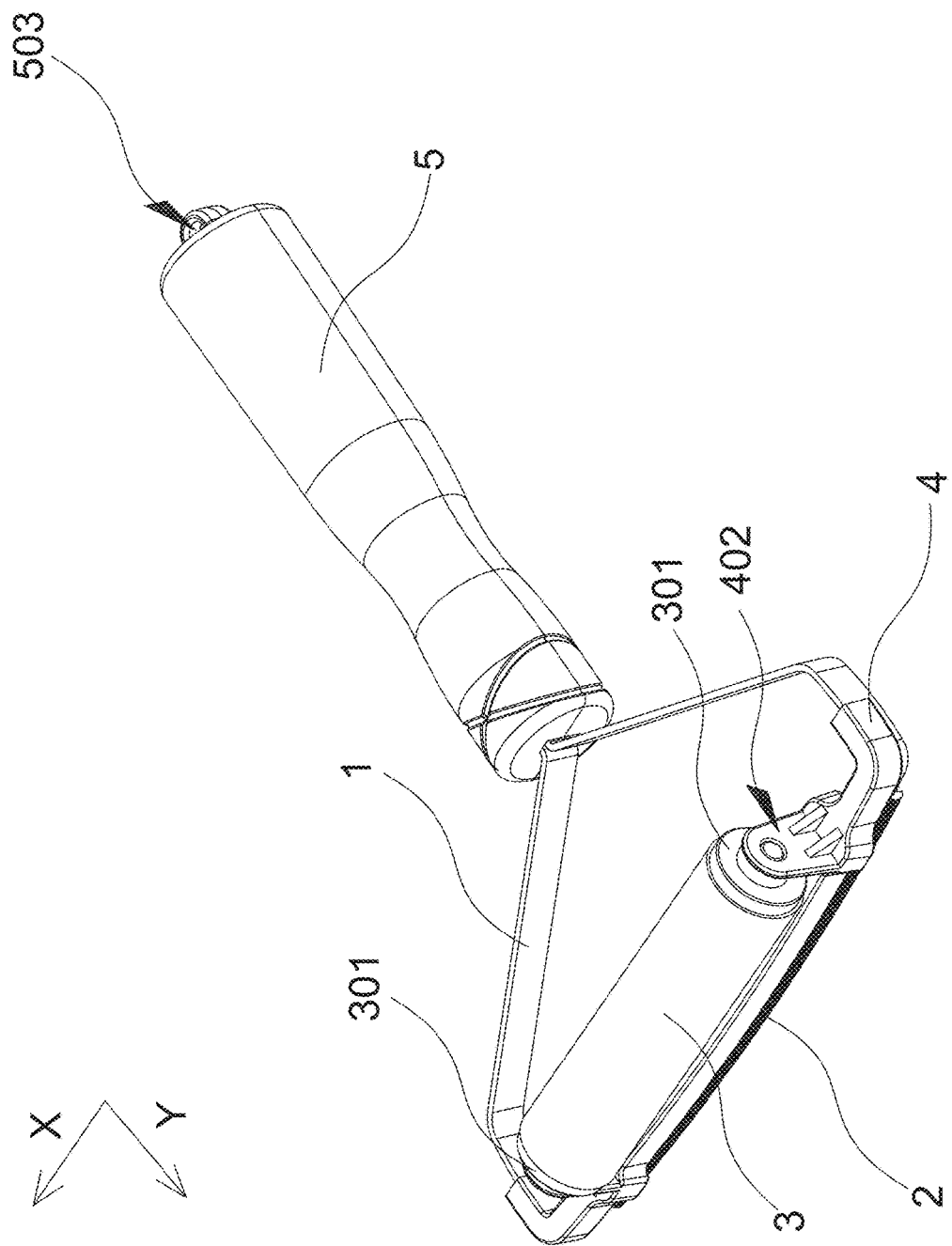
FIG. 3 is a structure diagram of the pet shaver provided in the embodiment of the present disclosure at one angle.
Figure 4:
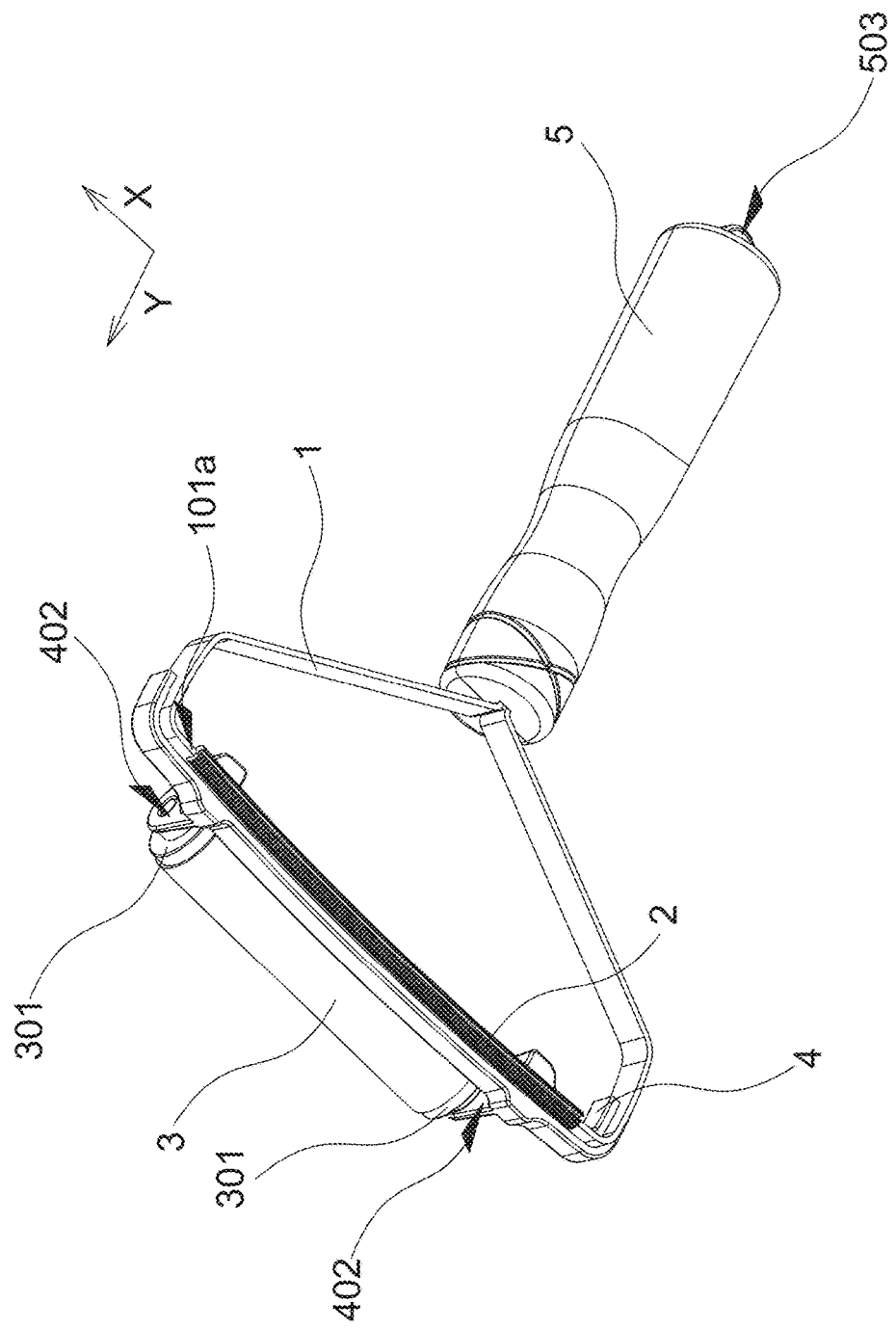
FIG. 4 is a structure diagram of the pet shaver provided in the embodiment of the present disclosure at another angle.

As shown in FIGS. 1-4, an embodiment of the present disclosure provides a pet shaver, including: a main body frame 1, a shaving strip 2 and a roller 3, where the main body frame 1 has a working end 101, the working end 101 at least partially extends in a first direction X, and the working end 101 has a first side portion 101a and a second side portion 101b which are opposite to each other; the shaving strip 2 is arranged on the first side portion 101a and extends in the same direction as the portion of the working end 101 extending in the first direction X; and the roller 3 is detachably connected to the second side portion 101b, an axis of the roller 3 extends in the first direction X, the roller 3 is capable of rotating around the axis relative to the second side portion 101b, and a circumferential surface of the roller 3 is provided with an adhesive layer.

Preferably, the main body frame 1 can be formed from a strip-shaped metal material by means of a sheet metal bending process, two ends of the main body frame 1 in a second direction Y respectively form the annular working end 101 and a strip-shaped connection end 102 extending in the second direction Y, the annular working end 101 at least includes a strip-shaped frame partially extending in the first direction X. and the strip-shaped frame has the first side portion 101a and the second side portion 101b which are opposite to each other.

Optionally, the main body frame 1 can also be formed from a plastic material by means of an injection molding process.

Preferably, the shaving strip 2 extending in the first direction X is arranged on the first side portion 101a, and the shaving strip 2 forms a comb tooth structure by means of a plurality of metal shaving blades uniformly arranged at intervals in the first direction X, such that the shaving strip 2 can shave hair of a pet when moving in the second direction Y.

Preferably, a mounting frame 4 is arranged on the second side portion 101b, the mounting frame 4 is formed from a plastic material by means of injection molding, and a mounting groove 401 fitted with the second side portion 101b is formed on one side of the mounting frame 4 by means of injection molding, such that the mounting frame 4 can be clamped at the second side portion 101b in an interference fit manner by means of the mounting groove 401; and two connection frames 402 are arranged on the side of the mounting frame 4 facing away from the mounting groove 401, a shaft hole is formed in a penetrating manner in each connection frame 402 in the first direction X, the roller 3 extends in the first direction X, and two ends thereof in an extension direction are rotatably connected to the shaft holes in the two connection frames 402 respectively, such that the roller 3 can roll around the axis thereof relative to the main body frame 1 under the action of a friction force when the pet shaver moves for use in the second direction Y.

Preferably, the roller 3 is of a hollow circular tubular structure, each of the two ends of the roller 3 in the extension direction is provided with a shaft head structure 301, and the roller 3 can be detachably connected to the shaft holes in the two connection frames 402 by means of the two shaft head structures 301.

Preferably, the circumferential surface of the roller 3 is provided with the adhesive layer, and the adhesive layer can be a rubber coating formed from a viscous soft rubber material.

Optionally, the adhesive layer can also be made of a felt material capable of generating static electricity and coating the circumferential surface of the roller 3 in a wound manner, or the adhesive layer can also be in the form of multi-layer removable adhesive paper.

Preferably, a handle 5 is further mounted at the connection end 102 of the main body frame 1, the handle 5 can be formed by combining a first housing 501 and a second housing 502 which are injection-molded and fitted with each other, and several groups of corresponding structures of mounting holes 504 and mounting columns 505 are respectively formed in the first housing 501 and the second housing 502 by means of injection molding, such that the first housing 501 and the second housing 502 can be snap-fitted with each other by means of the corresponding mounting holes 504 and mounting columns 505 so as to form the handle 5.

Preferably, clamping groove structures are formed in the first housing 501 and the second housing 502 by means of injection molding, and a limiting structure 102a fitted with the clamping groove structures is formed at the connection end 102 of the main body frame 1 by means of a sheet metal bending process or an injection molding process, such that the connection end 102 of the main body frame 1 can be clamped with the clamping groove structures in the first housing 501 and the second housing 502 by means of the limiting structure 102a.

Optionally, the handle 5 can also be of an integrated structure, and can be formed from a wooden material or a metal material by means of machining, or be formed integrally from a plastic material by means of an injection molding process or a blow molding process, and the connection end 102 of the main body frame 1 is inserted in one side of the integrated handle 5.

Preferably, the handle 5 is of a columnar structure with a curved surface, and the curved surface of the handle 5 can have different radii of curvature in the second direction Y, so as to improve the holding feeling of the handle 5 and increase the friction force during use.

Preferably, the curved surface of the handle 5 can be coated with a rubber coating or be provided with a knurling structure by means of machining, so as to increase the friction force during use.

Preferably, the end of the handle 5 away from the main body frame 1 in an extension direction is provided with an annular strap hole 503, and a hanging strap can pass through the strap hole 503, thereby facilitating hanging and storage of the pet shaver.

From the above description, it can be seen that the pet shaver provided in the above embodiment of the present disclosure achieves the following technical effects:

compared with the prior art, during use of the pet shaver provided in the embodiment of the present disclosure, the comb-tooth-shaped shaving strip 2 can move in the second direction Y to shave the hair of the pet. When the scattered hair needs to be cleaned, the pet shaver can be moved in the second direction Y, the roller 3 rolls around the axis thereof, and the adhesive layer provided on the circumferential surface of the roller 3 can be used to adhere the scattered hair. The pet shaver provided in the embodiment of the present disclosure can have the functions of shaving the pet and cleaning the scattered hair of the pet at the same time, and can effectively solve the technical problem that the scattered hair needs to be cleaned by means of additional cleaning tools after a single shaver is used; in addition, after the shaving function and the hair cleaning function are integrated in the same tool, the tool purchase cost can be reduced, and meanwhile, the defect of inconvenience in storage and use due to the excessive tools can also be effectively overcome.

The above is merely illustrative of the preferred embodiments of the present disclosure and is not intended to limit the present disclosure, and various changes and modifications may be made on the present disclosure by those skilled in the art. Any modification, equivalent substitution, improvement, etc. made within the spirit and principles of the present disclosure should be included in the scope of protection of the present disclosure.

What is claimed is:

1. A pet shaver, comprising:
   a main body frame, wherein the main body frame has a working end, a part of the working end extends in a first direction, and the part of the working end has a first side portion and a second side portion which are opposite to each other;
   a shaving strip which is arranged on the first side portion and extends in the first direction; and
   a roller detachably connected to the second side portion, wherein an axis of the roller extends in the first direction, the roller is capable of rotating around the axis relative to the second side portion, and a circumferential surface of the roller is provided with an adhesive layer.

2. The pet shaver according to claim 1, further comprising:
   a mounting frame, wherein one side of the mounting frame is provided with a mounting groove fitted with the second side portion, the second side portion is connected to the mounting frame by means of the mounting groove, and the roller is located on another side of the mounting frame facing away from the second side portion and is rotatably connected to the mounting frame, thereby defining the detachable connection between the roller and the second side portion.

3. The pet shaver according to claim 2,
   wherein two ends of the roller in a longitudinal axis direction of the roller are respectively provided with shaft head structures, the mounting frame is provided with two connection frames corresponding to the two shaft head structures respectively, and the roller is rotatably connected to the mounting frame by the two connection frames and the two shaft head structures.

4. Pet shaver according to claim 2, further comprising:
   a handle, wherein the main body frame further has a connection end extending in a second direction, the second direction is perpendicular to the first direction, and the handle is mounted to the connection end and extends in the second direction.

5. The pet shaver according to claim 4,
   wherein the handle comprises a first housing and a second housing fitted with each other and connected in a snap-fitted manner, the connection end is provided with a limiting structure, clamping grooves fitted with the limiting structure are formed in the first housing and the second housing respectively.

6. The pet shaver according to claim 4,
   wherein the handle has a free end defining a strap hole.

* * * * *